United States Patent Office 2,813,009
Patented Nov. 12, 1957

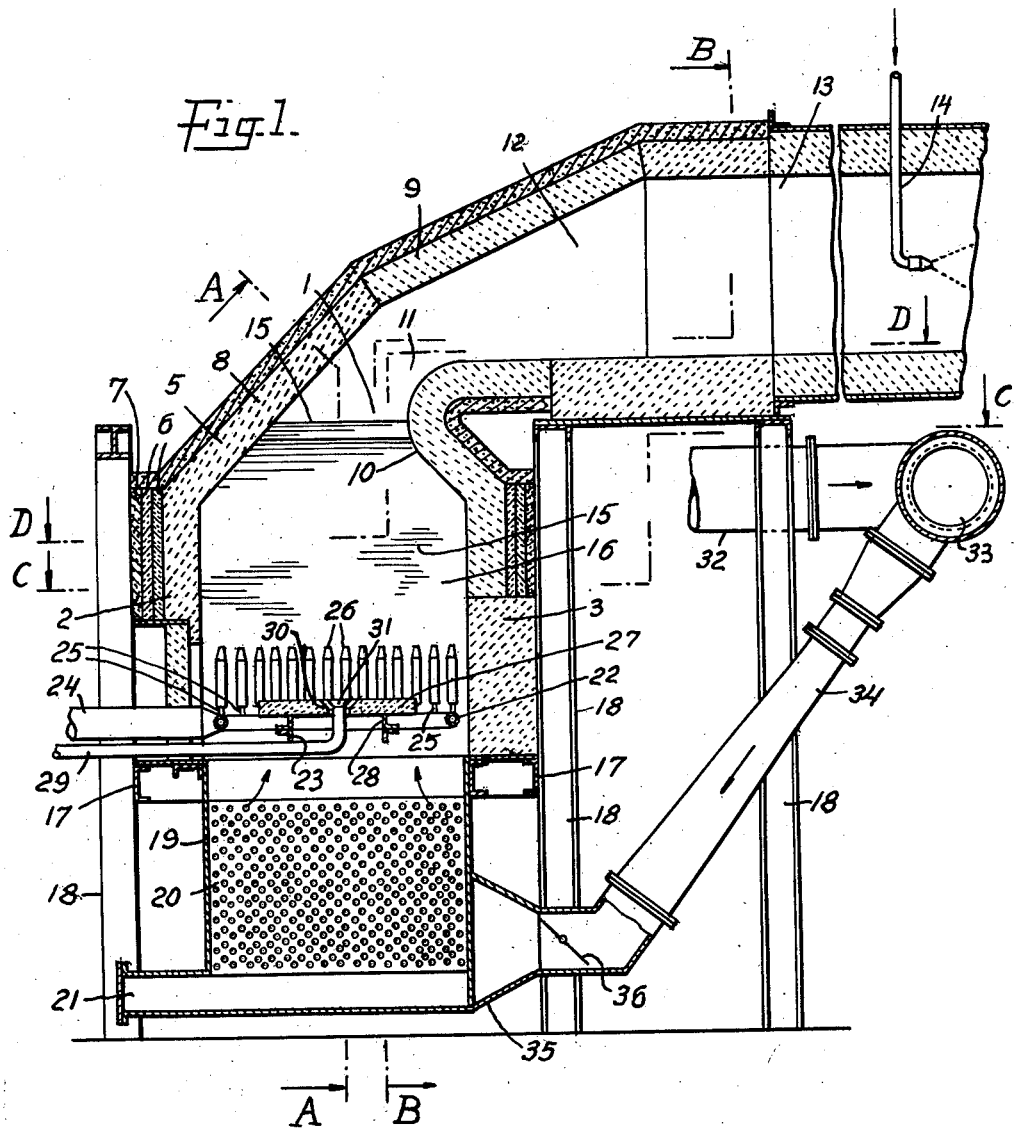

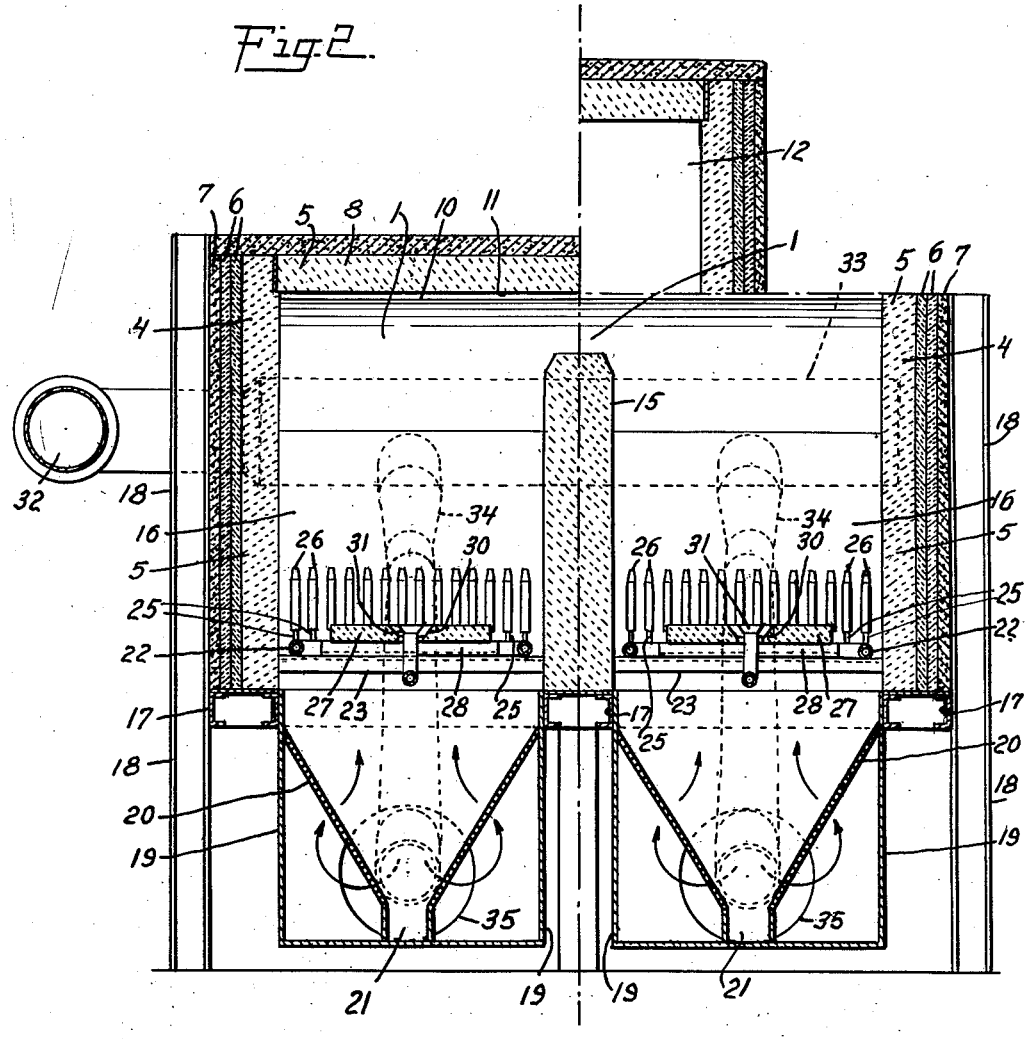

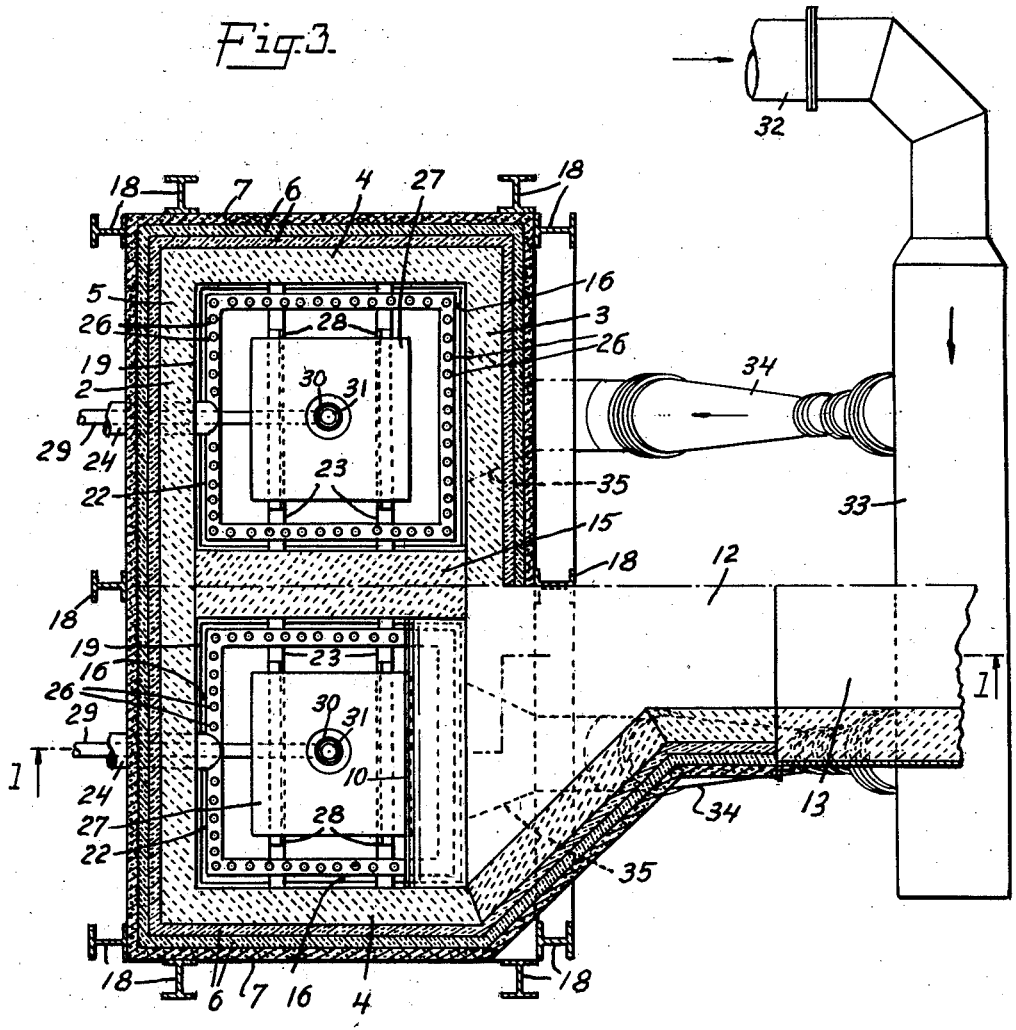

2,813,009

CARBON BLACK

Wesley C. Ekholm and George L. Heller, Monroe, La., assignors to Columbian Carbon Company, New York, N. Y., a corporation of Delaware Application March 14, 1952, Serial No. 276,640

8 Claims. (Cl. 23—209.6)

The present invention relates to the production of furnace carbons, and provides an improved process whereby furnace carbons having highly desirable characteristics may be produced in unusually high yields.

Various methods have heretofore been proposed for producing carbon blacks or furnace carbons by the partial combustion, or thermal decomposition, of normally gaseous hydrocarbons, natural gas, for instance. Some of these proposed processes have involved extremely rapid mixing of the hydrocarbons to be decomposed with hot combustion gases, while others have involved the partial combustion of the hydrocarbons by gradually mixing with air, under elevated temperature conditions. The characteristics of the resultant carbon black are greatly influenced by the environment in which the carbon particles are born and the extent of dispersion and the character of the hydrocarbons from which they are formed.

More recently, it has been proposed to utilize heavier, normally liquid hydrocarbons, including high molecular weight petroleum residues, and the like, in the production of furnace carbons, either to supplement or as a substitute for natural gas. Earlier processes in which such normally liquid hydrocarbons were used resulted in a coarse carbon pigment of the lamp black type and many difficulties have been encountered where it was attempted to make fine furnace carbons suitable for rubber compounding from such heavier hydrocarbons, especially those of petroleum residuum type.

A primary difficulty has been that of effecting sufficiently fine subdivision or dispersion of the hydrocarbons prior to the decomposition by which the carbon particles are formed. Heavy petroleum residues will usually not vaporize at a temperature below that where carbon forming decomposition occurs, and, therefore, adequate dispersion of the hydrocarbons cannot be effected by a preliminary vaporization alone. Further, where the decomposition is effected by a progressive partial combustion, such as normally occurs where the hydrocarbons are gradually mixed with air and flaming gases, there is an uneven heating, resulting in carbon-forming decomposition of a part, at least, of the hydrocarbons before adequate dilution has been effected.

It has been proposed to improve the quality of the resultant furnace carbon by subjecting the high molecular weight hydrocarbons to a partial pyrolysis prior to effecting the dispersion thereof in hot furnace gases. Where this partial pyrolysis is effected in tubular heaters, extreme care must be exercised to prevent coking in the tubes. Where effected in contact with flaming gases, extremely rapid mixing is necessary in order to avoid uneven heating.

Our present invention provides an improved method of producing fine, rubber-reinforcing furnace blacks from liquid hydrocarbons whereby adequate dispersion of the normally liquid hydrocarbons is effected prior to carbon-forming decomposition or substantial partial combustion thereof, and whereby the hydrocarbons are uniformly heated, vaporized, and partially pyrolyzed within a furnace chamber substantially solely by intense radiant heating without substantial combustion, and while out of contact with flaming gases.

In its broader aspect, our present invention comprises burning a gaseous fuel in the presence of a free oxygen-containing gas, for instance, natural gas and air, about the periphery of an intermediate zone of a vertically elongated chamber and subjecting said intermediate zone to intense radiant heat from the resultant flame. The liquid hydrocarbon is sprayed upwardly through said intermediate zone, out of contact with the flame, and without substantial combustion thereof and in passing upwardly through the zone is subjected to intense radiant heating which effects the vaporization and partial pyrolysis of the liquid hydrocarbons. These vaporized and pyrolyzed hydrocarbons continue upwardly through the furnace chamber and at a zone of the chamber immediately above the intermediate zone are subjected to partial combustion to form a canopy of highly luminous flame from which the intermediate zone is subjected to further intense radiant heat. In this upper zone, the hydrocarbons are decomposed to form carbon black in suspension in the furnace gases, which suspension passes from the upper end of the furnace chamber, and from which carbon black is separated and recovered, as in conventional practice.

The flame about the periphery of the intermediate chamber need not be a continuous wall, but may, with advantage, be composed of a multiplicity of flames.

These peripheral flames may, with advantage, be produced by burning a gaseous fuel from a plurality of burner tips uniformly spaced about the periphery of the intermediate zone, while supplying air for combustion or partial combustion in any conventional manner. In order to increase the intensity of the heat radiation, it is particularly advantageous that both the gas and air be substantially preheated before mixing. This may be accomplished by flowing the fuel gas upwardly to the respective burner tips through elongated burner tubes extending upwardly about the periphery of the lower portion of said intermediate zone and flowing the air for combustion upwardly around said tubes so that both the tubes and the air are subjected to intense radiant heating.

We have, with particular advantage, used for this purpose, refractory burner tubes having an inside diameter within the range of 3/32 inch to one inch and having walls approximately 1/4 inch thick and flowing the air upwardly around said tubes at a relatively low velocity.

The gaseous fuel may consist of a normally gaseous hydrocarbon, for instance, natural gas, or such hydrocarbon enriched by mixing therewith a higher boiling hydrocarbon in gas or vapor form, or may consist wholly or partly of refinery gases or other fuel gas.

According to a presently preferred embodiment of the invention, gaseous hydrocarbons are caused to flow upwardly as a plurality of confined streams of relatively small diameter, i. e., of a diameter within the range of 3/32 inch to 1 inch, through burner tubes positioned vertically about the lower portion of the intermediate zone of the furnace chamber, the tubes being uniformly and closely spaced about the periphery of said chamber and subjected to radiant heating, as previously described. Air for combustion is caused to flow upwardly around the burner tubes at a velocity advantageously not exceeding 3 feet per second, so as to minimize turbulence, and become highly heated.

The burner tubes are adapted to withstand high temperatures and have an inside diameter within the range indicated, and are of a length such that their upper ends terminate a substantial distance, of the order of 3 or 4 feet, from the upper end of the furnace chamber.

At the upper end of these burner tubes, the respective hydrocarbon gas streams are ignited by reason of the high temperature in the furnace chamber and the presence of air and are burned or partially burned so as to radiate heat to other portions of the furnace chamber, especially the above-described intermediate zone.

The burner tubes, as previously noted, are themselves so positioned as to be exposed to the heat radiated from the flames and that re-radiated from hot refractory surfaces within the furnace chamber, and thereby the hydrocarbon streams passing therethrough are highly preheated, advantageously to a temperature within the range of 1400° F. to 2400° F. The air stream passing upwardly through the furnace chamber is likewise strongly preheated before coming into contact with the gaseous hydrocarbons. By reason of this preheating, the hydrocarbon burns with an intensely hot flame, thus intensifying the heat radiation just described. In this manner there is formed within the furnace chamber an intermediate zone subjected to intense radiant heat.

A liquid hydrocarbon is sprayed upwardly through this zone of radiant heating by means of a spray nozzle symmetrically positioned within the furnace chamber, and advantageously somewhat below the upper ends of the burner tubes. This oil spray is thus highly heated, vaporized, and pyrolyzed by the intense radiant heat as it passes upwardly through the zone of radiant heating, i. e., the said intermediate zone of the furnace chamber, and, as it continues its upward passage through the furnace chamber, is decomposed in the zone of partial combustion to form carbon black in suspension in the hot furnace gases. The furnace gases having carbon black suspended therein, are withdrawn from the upper end of the furnace chamber and the carbon black recovered theerfrom, as in conventional practice.

The oil spray is injected into the furnace chamber at a very high initial velocity, in excess of 500 feet per second and advantageously of the order of 800 feet per second. Initial velocities in excess of about 1400 feet per second are not generally desirable. This may be accomplished by means of either a single-fluid spray nozzle, or a two-fluid spray nozzle. It is usually more advantageous to use a two-fluid spray nozzle, especially where the liquid hydrocarbon is of the high viscosity residue type. Also, when using such heavy residues, it is usually advantageous to preheat the oil to reduce its viscosity to 35 to 40 S. F. V. (Saybolt furol viscosity) at 160° F. to facilitate the spraying. However, the temperature of the oil should not be raised as high as that at which carbon-forming decomposition occurs.

We have for this purpose used, with particular advantage, a two fluid spray nozzle supplied by Spray Engineering Company and designated 5BM, the oil being supplied to the nozzle at a pressure of 5 to 15 pounds per square inch and atomizing steam, or air, being supplied at a pressure of 30 pounds to 80 pounds per square inch.

We have, with particular advantage, used as the oil an aromatic petroleum residue from the thermal cracking of a catalytic cracking cycle stock, or an equivalent fraction. However, any liquid hydrocarbon oil fraction having a maximum viscosity factor of 100 S. F. V. at 160° F. may be used.

The liquid spray entering the furnace chamber is plainly visible as such for a substantial distance above the spray nozzle, but without visible flame. Above this zone of visibility, the spray becomes a transparent vapor, but there is still no visible burning of the hydrocarbon for a further substantial distance upwardly through the chamber. Above the zone last mentioned, and usually at a distance of about 1½ to 2 feet above the spray nozzle, there is developed a roof of highly luminous flame, the radiant heat from which supplements that from the peripheral flames previously described and serves to heat the burner tubes, and the gas passing therethrough, as well as the incoming oil spray and air.

We have found it particularly advantageous to position the oil spray nozzle slightly below or about flush with the upper surface of a horizontally extending flat slab or block of furnace refractory, or a metal plate covered with furnace refractory, symmetrically positioned with respect to the transverse area of the furnace chamber and extending over an area about 20% to 30% of the transverse area of the chamber, the spray nozzle extending upwardly through, or just below, a centrally positioned opening in said slab. This slab becomes highly heated by heat radiation previously described and serves as a re-radiating surface. Air is introduced into the furnace chamber below the slab and rises, primarily, through the annular space between the edge of the slab and the inner wall of the furnace chamber. The slab also serves to shield the oil supply pipe from the intense heat radiation and to direct the upwardly rising air toward the peripheral flames and away from the oil spray.

The emergence or initial angle of spread of the spray is, with advantage, relatively small, say about 5°. Considerable further spread of the spray is caused by thermal effects. However, the spread of the spray should not be so great as to cause the spray to impinge upon the peripheral flames, the burner tubes, or the side walls of the furnace chamber. This may be controlled by varying the distance of the spray nozzle below the upper ends of the burner tubes and adapting the size of the spray to the transverse area of the chamber, or intermediate zone thereof.

The extent of preheating of the hydrocarbon gas streams passing through the burner tubes may be regulated by varying the length of the burner tubes and also the diameter of the gas streams. The thickness of the walls of the burner tubes also influences somewhat the amount of preheating. However, the latter is of relatively minor importance. Burner tubes which have been used, with particular advantage, in carrying out the process of our present invention are those composed of silicon carbide or alumina or mullite, or similar material capable of withstanding high temperatures, and of a length of about 6 inches to 18 inches. Such tubes about 1 foot in length have been found especially advantageous under most operating conditions. Tubes of this type usually have a wall thickness of about ¼ inch.

The furnace chamber may be either round or rectangular. Square furnaces and also rectangular furnaces having a transverse section 2 feet by 3 feet have been found highly satisfactory. Where the furnace chamber is round or square, a single row of peripheral burner tubes may be used with advantage. Where a rectangular chamber other than square is used, for instance of greater depth than width, it is usually desirable to have a double row of burner tubes along the end walls and a single row along the side walls, so as to compensate for the greater distance from the oil spray by a greater heat generation.

The invention will be more fully described and illustrated with references to the accompanying drawings which represent conventionally and somewhat diagrammatically a particularly advantageous type of apparatus for carrying out the process.

Figure 1 of the drawings is a vertical, sectional view of the furnace and auxiliary equipment through line 1, of Fig. 3;

Figure 2 is an end sectional elevation, the left side of which is along line AA of Fig. 1 and the right side along the line BB of Fig. 1; and Figure 3 is a horizontal sectional view, the upper half of which is along line CC of Fig. 1 and the lower half along line DD of Fig. 1.

The apparatus comprises a furnace chamber 1 having a front wall 2, a rear wall 3, and side walls 4, constructed of a furnace lining of firebrick 5, or other suitable furnace refractory, covered on the outside with two layers of heat insulating materials 6 all encased in a hard airtight cement coating, or preferably sheet metal casing 7, as more clearly shown in Figure 2. The upper end of the chamber 1 is constricted by the suspended roof members 8 and 9 and a shoulder 10 forming a throat 11 which opens through passageway 12 into the conduit 13 which leads to conventional cooling and collecting apparatus and in which there may be positioned water spray nozzles, such as indicated at 14.

As more clearly shown in Figure 2, the chamber 1 is divided by a partition wall 15 extending from the front wall 2 to the rear wall 3 of chamber 1 and constructed of firebrick or the like so as to divide the furnace into two rectangular chambers 16 opening at their upper ends into the upper portion of the chamber 1 and connected through the furnace throat 11 with the passageway 12, previously described. The partition wall 15 and also the outer walls of the furnace are supported by horizontal channel irons 17 which, in turn, are supported by vertical structural steel members 18.

The chambers 16 extend downwardly below the furnace walls, the lower ends thereof being enclosed by a metal casing 19. The lower extensions of the chambers are partitioned by inclined perforated metal plates 20, extending from front to rear of the chambers and forming a trough-shaped partition opening at its lower end into a clean-out conduit 21.

Positioned in each of the chambers 16 above the perforated plates is a manifold or header 22 extending about the periphery of the chamber and supported by supporting member 23, gaseous hydrocarbon being supplied to the header by supply pipe 24.

Spaced along the manifold 22 are upwardly extending nipples 25, on each of which there is removably fitted a burner tube 26.

Symmetrically positioned within each chamber 16 is a horizontally extending slab 27 of furnace refractory supported by supporting members 28. An oil supply pipe 29 extends into the furnace chamber and upwardly through an opening 30 symmetrically positioned in the slab, the upper end of said oil supply pipe being equipped with a spray nozzle represented at 31.

Air for supporting the partial combustion of the hydrocarbons is supplied under pressure, as from a conventional blower, through air duct 32 to manifold 33 from which the air passes through the venturi tubes 34 and connections 35 into the lower end of the chambers 16 beneath the perforated partition 20. The venturi tubes are provided with conventional equipment, not shown, for measuring the amount of air passed therethrough. The connections 35 are equipped with dampers, such as indicated at 36 for regulating and controlling the amount of air passed to the respective chambers. The air passes upwardly through the perforated partitions 20 and is thereby uniformly distributed over the transverse area of the chamber. This air flows upwardly around slab 27 and through the chambers 16, as previously described herein.

In operation, natural gas, or other gaseous fuel, either enriched or unenriched, and either diluted or undiluted by steam, is supplied through conduit 24 to the gas manifold 22 and, from thence, flows upwardly through the nipples 25 and the respective burner tubes 26, from the upper ends of which the gas passes into the furnace chamber in contact with the rising air stream and is therein burned or subjected to partial combustion.

As previously described herein, the burner tubes and the fuel gas streams flowing therethrough are highly heated by heat radiation from the burning hydrocarbons, and the intermediate zone of the furnace chamber lying above the slab 27, is likewise subjected to intense radiant heat. Simultaneously with the combustion or partial combustion of the gas streams, the liquid hydrocarbon, supplied through the oil supply line 29 to the spray nozzle 31, is sprayed upwardly into this zone of intense radiant heat. For simplicity, a single-fluid spray nozzle has been indicated, but it will be understood, as previously stated herein, that a two-fluid nozzle may be used with advantage. Further this nozzle may be protected from overheating by a water jacket, or the like.

Where the furnace chamber is of substantially square transverse section, as indicated in the drawings, one may, with advantage, use a single row of burner tubes about the periphery of the chamber, as shown. However, where a chamber of greater depth than width is used, we have, with advantage, used a double row of burners across the narrower ends of the chamber and a single row of burners along the longer sides.

The invention will be further illustrated by the following specific example of the process carried out in apparatus substantially as represented by the drawings, except that it comprised a single furnace chamber 2 feet wide and 3 feet in depth. In this operation, the oil spray nozzle was of the two-fluid type obtained from Spray Engineering Company and designated 5 BM. This furnace was equipped with 38 burner tubes, ½ inch I. D., and approximately 1 foot long, uniformly spaced about the periphery of the chamber, two rows along each end and one row along each side. The refractory slab through which the oil spray entered the furnace chamber was approximately 2½ inches thick and measured 9 inches by 13½ inches. The opening extending through the center of this slab was 4 inches to 5 inches in diameter, there being a substantial annular opening surrounding the spray nozzle.

Air was supplied to the lower end of the furnace chamber at a rate of 25,000 cubic feet per hour and natural gas was supplied to the burner tubes at a rate of 2,500 cubic feet per hour. An aromatic residue from the thermal cracking of catalytic cycle stock was sprayed into the furnace chamber at a rate of 21 gallons per hour, using atomizing steam at a pressure of 55 pounds per square inch and an oil pressure of about 10 pounds per square inch. The oil was passed to the nozzle at a temperature approximately 210° F. and steam was supplied at the rate of 850 cubic feet per hour. The temperature of the air in the lower portion of the furnace chamber, beneath the refractory slab, was observed to be 500° F. and the air flowing upwardly around the edges of the slab was found to have a temperature of 1,000° F. The temperature of the furnace chamber in the zone at the level of the upper ends of the burner tubes was 2300° F. and the temperature at the throat leading from the furnace chamber was approximately 2500° F.

In this operation, there was produced 126 pounds per hour of a furnace carbon having an ABC color value of 90, a tinting strength 73% of the tinting strength of a commercial grade of black designated Statex B and an oil absorption of 17.8 gallons per 100 pounds. In this operation, there was no visible burning of the oil for a distance of 15 inches to 18 inches above the spray nozzle.

The ratio of air to gas supplied to the operation may be varied somewhat, due consideration being given to the required velocities and velocity ratios. We have, with advantage, varied the air-gas ratios within the range extending from 7:1 to 15:1 but generally a ratio of about 10:1 is most advantageous. It is usually desirable to maintain the rate of oil supply at about 0.8 gallon to 0.9 gallon per 1,000 cubic feet of air, calculated under standard temperature and pressure conditions. However, this range may, with advantage be varied from about 0.5 gallon to about two gallons per thousand cubic feet of air. In the operation just specifically described, we have varied the rate of oil supply over the range of 18 gallons per hour to 24 gallons per hour, without materially changing the character of the product but with a commensurate variation in yield. Also, in operations of this type atomizing steam may be used at the rate as high as 1100 cubic feet per hour without detrimentally affecting the operation.

The peripheral gas streams, when composed of natural gas, may be heated to 1400° F. or higher, but not exceeding 2400° F. Where less refractory hydrocarbons are present, care should be exercised to avoid coking the burner tubes and such high temperatures will usually not be permissible.

The distance between peripheral burner tubes is subject to considerable variation but generally should be within the range of 3.4 to 8.25 times the inside diameter of the tubes.

In the operation of the process it is not essential that the peripheral flames be initiated at the respective burner tips. By control of the velocities and relative velocities of the gaseous fuel and the rising air current such that the upward velocity of the air does not exceed three feet per second and the velocity of the gas stream issuing from the burner tips is at least 12 times that of the air current, as more particularly described in the copending application of one of us, Serial No. 37,023 filed July 3, 1948, the fuel gas streams may be caused to rise a substantial distance above the burner tips before there is any visible burning of the gas streams. In this way, the heating of the gaseous fuel and rising air current, before any substantial visible combustion is initiated, may be promoted. Under such conditions, the luminous portion of the peripheral flames may extend downwardly only a short distance below the canopy of luminous flame. Indeed the process has been successfully carried out under conditions where visible combustion of the peripheral flames is initiated just below the canopy of flame and the invention in its broader aspect contemplates such operation.

By our present process, we can produce furnace carbons having characteristics closely approximating those of the furnace carbons produced by the process described and claimed in the copending application Serial No. 37,023 just noted, but with somewhat more pronounced "structure" characteristics. Further, by our present process, we can obtain, an apparatus of a given size, yields substantially greater than those obtained by the process of said copending application.

While we cannot presently describe with certainty the precise phenomena which occur in our present process, it appears that the hydrocarbon introduced as the liquid spray passes successively through three distinct stages. Entering as a visible liquid spray, it is rapidly converted to a transparent stream, indicative of substantially complete vaporization. That this vaporization is effected without substantial carbon-forming decomposition, is indicated by the absence of incandescent or other visible carbon from the stream. As this stream of vapors continues upwardly through the intermediate zone of the furnace chamber, each molecule thereof is subjected to continued radiant heating, substantially uniform both as to intensity and duration so that substantially uniform pyrolysis is effected. There is a surprisingly sharp lower boundary of the overlying canopy of luminous flame, the luminosity of which is, of course, indicative of the presence of incandescent carbon particles. Below this boundary there is no visible burning of the hydrocarbons of the oil spray. It appears, therefore, that the carbon forming decomposition of the hydrocarbons of the oil spray is initiated as those hydrocarbons suddenly and uniformly move into this canopy of luminous flame, following the uniform heating, vaporization and pyrolysis of the hydrocarbons effected substantially solely by the intense radiant heating.

We claim:

1. A process for producing furnace black from liquid hydrocarbons, which comprises passing a relatively non-turbulent stream of free oxygen-containing gas upwardly through a vertically elongated chamber, burning a gaseous fuel in contact with the free oxygen-containing gas about the periphery only of the chamber in a zone thereof just below a zone of partial combustion positioned in the upper end of said chamber to form radiant flame about the periphery of said lower zone and thereby subjecting the interior portion of said lower zone to radiant heat from the peripheral flame and from the said zone of partial combustion, separately spraying a stream of the liquid hydrocarbons upwardly through the said interior portion of the lower zone of the furnace chamber from a point below the level of the peripheral flame and out of contact with the peripheral flame and solid surfaces and thereby heating the liquid hydrocarbon while passing through said lower zone, substantially solely by radiant heat and without substantial combustion, to the pyrolysis temperature of the hydrocarbons and there vaporizing and pyrolyzing said hydrocarbons and immediately thereafter passing the resultant pyrolyzed hydrocarbons to the said zone of partial combustion and therein mixing said pyrolyzed hydrocarbons with the said oxygen-containing gas in proportions sufficient to effect only partial combustion of the hydrocarbons and burning a portion of the hydrocarbons and decomposing a further portion thereof to form carbon black in gaseous suspension, passing the suspension from the zone of partial combustion and separating the furnace black therefrom.

2. The process of claim 1 in which the liquid hydrocarbon is sprayed upwardly through the radiantly heated zone at an initial velocity of the order of 800 feet per second.

3. The process of claim 1 in which the temperature and heat radiation from the peripheral flame are intensified by preheating the gaseous fuel and the oxygen-containing gas prior to contact between the two.

4. The process of claim 3 in which the preheating of the gaseous fuel and oxygen-containing gas is effected by exposing them separately to the radiant heat in the said lower zone of the chamber.

5. The process of claim 3 in which the liquid hydrocarbon is a heavy petroleum residue.

6. The process of claim 5 in which the petroleum residue is an aromatic residuum resulting from the thermal cracking of the cycle stock from the catalytic cracking of petroleum.

7. The process of claim 3 in which the gaseous fuel is preheated to a temperature within the range of 1400° F. to 2400° F. before contact with the oxygen-containing gas.

8. The process of claim 3 in which the zone of radiant heating is of a depth of 1½ to 2 feet.

References Cited in the file of this patent
UNITED STATES PATENTS

| Number | Name | Date |
|---|---|---|
| 1,904,469 | Keller | Apr. 18, 1933 |
| 2,114,738 | Heller et al. | Apr. 19, 1938 |
| 2,144,971 | Heller | Jan. 24, 1939 |
| 2,375,795 | Krejci | May 15, 1945 |
| 2,553,199 | Loving | May 15, 1951 |
| 2,563,460 | Faber | Aug. 7, 1951 |
| 2,597,232 | Ekholm | May 20, 1952 |
| 2,597,991 | Heller | May 27, 1952 |
| 2,617,714 | Arnold | Nov. 11, 1952 |
| 2,625,466 | Williams | Jan. 13, 1953 |
| 2,652,313 | Loving | Sept. 15, 1953 |